United States Patent
Luk et al.

(10) Patent No.: US 6,976,025 B2
(45) Date of Patent: Dec. 13, 2005

(54) DATABASE AND METHOD FOR STORING A SEARCHABLE SET OF KEYWORDS

(75) Inventors: Robert Wing Pong Luk, Kowloon (HK); Wai Chung Yip, Kowloon (HK)

(73) Assignee: Hong Kong Polytechnic University, Hong Kong (HK)

( * ) Notice: Subject to any disclaimer, the term of this patent is extended or adjusted under 35 U.S.C. 154(b) by 409 days.

(21) Appl. No.: 10/112,043

(22) Filed: Apr. 1, 2002

(65) Prior Publication Data

US 2003/0187856 A1 Oct. 2, 2003

(51) Int. Cl.[7] .......................... G06F 17/30; G06F 7/00; G06F 17/00
(52) U.S. Cl. ........................................... 707/100; 707/3
(58) Field of Search ..................................... 707/100, 3

(56) References Cited

U.S. PATENT DOCUMENTS

| | | | | |
|---|---|---|---|---|
| 5,745,600 A | * | 4/1998 | Chen et al. | 382/218 |
| 6,263,333 B1 | * | 7/2001 | Houchin et al. | 707/5 |
| 2002/0156551 A1 | * | 10/2002 | Tackett et al. | 700/245 |

OTHER PUBLICATIONS

Larsson N. Jesper "Structure of String Matching and data compression", Department of computer science Lund University, Copyright 1999.*

Miguel A. Ruiz–Sanchex et al. "Survey and Taxonomy of IP address lookup algorithms", IEEE Network Mar./Apr. 2001.*

Panar Altin Yilmaz et al. "A Trie–based algorithm for IP lookup problem", New Jersey Institute of Technology, copyright 2000.*

* cited by examiner

*Primary Examiner*—Frantz Coby
*Assistant Examiner*—Cindy Nguyen
(74) *Attorney, Agent, or Firm*—Jackson Walker, LLP

(57) ABSTRACT

A methods for storing a searchable set of keywords includes concatenating the keywords to form a string, and defining one or more links between two or more characters in the string. A delimiting character separates the keywords in the string, and the links are pointers. Any inaccessible characters in the string are removed to improve the storage cost the method.

13 Claims, 14 Drawing Sheets

K = {cityu, hkbu, hku, hkust, polyu}

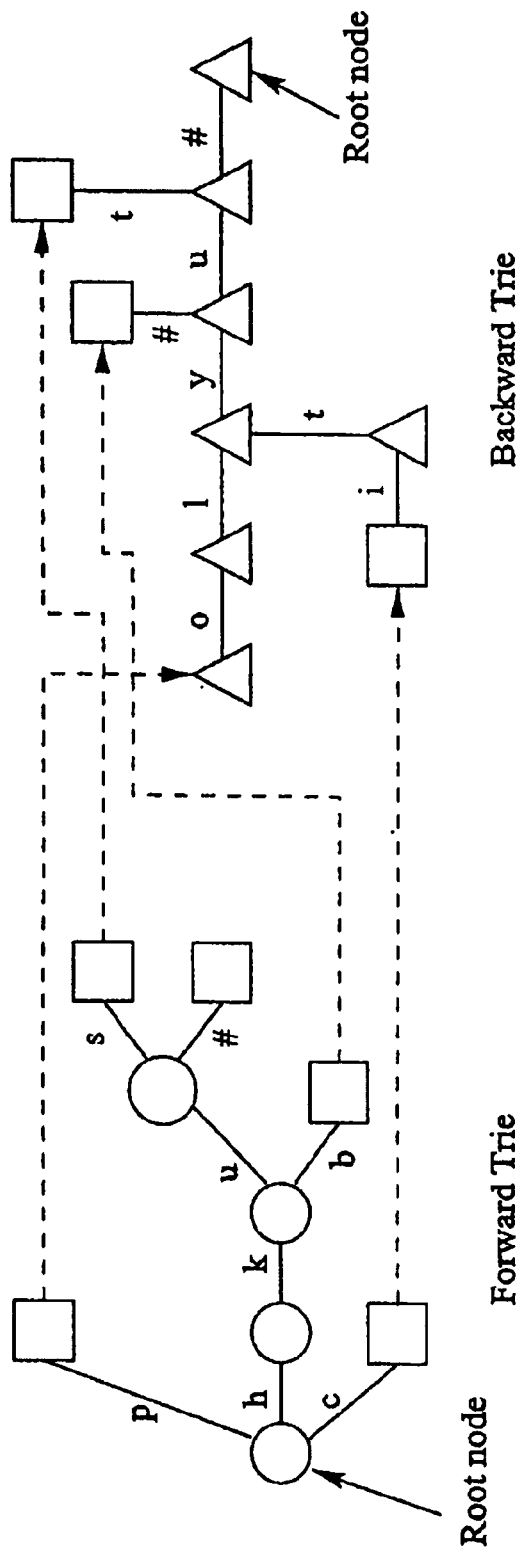
Figure 9 (a) Two-trie (Prior Art)

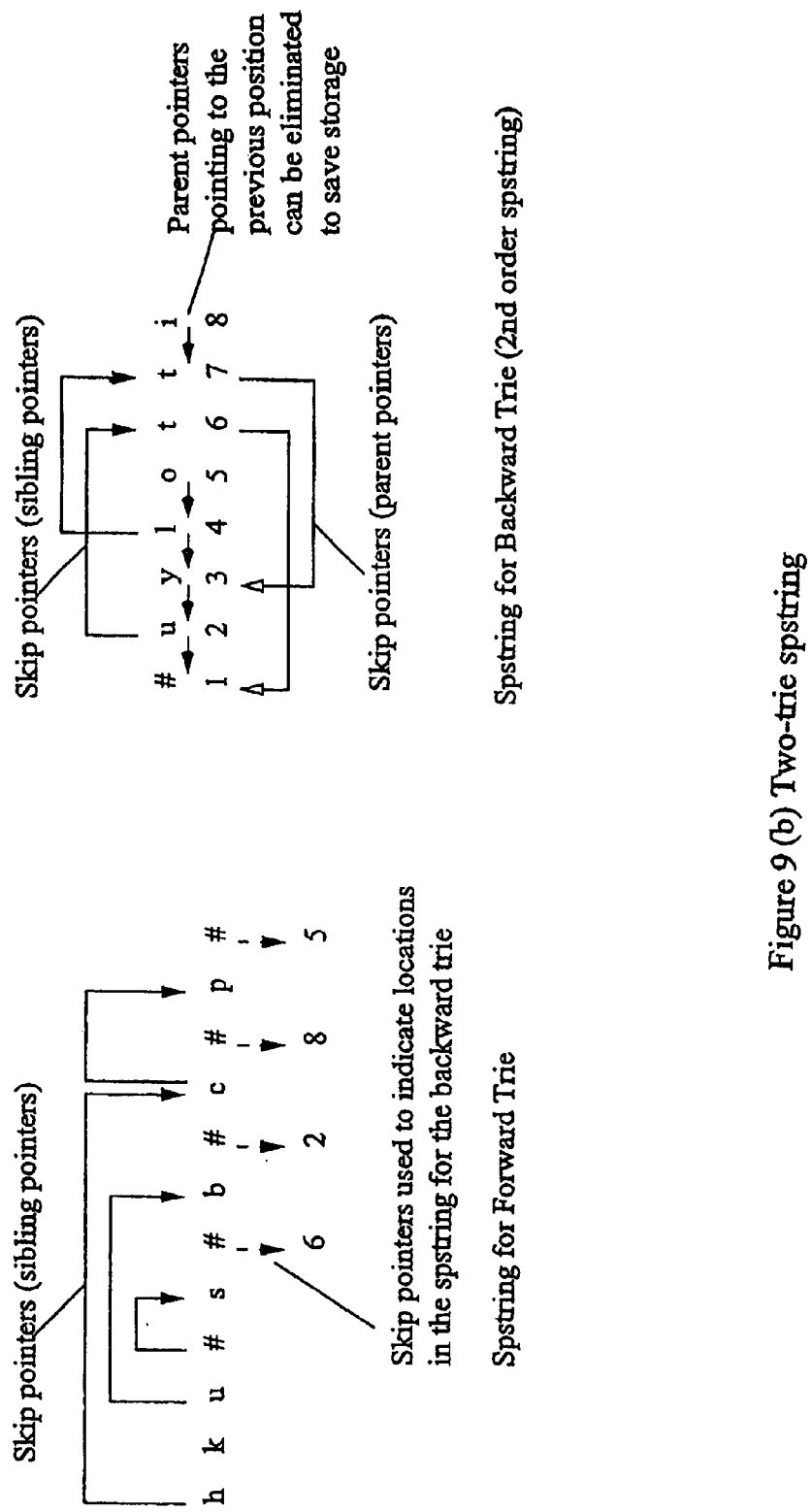
Figure 9 (b) Two-trie spstring

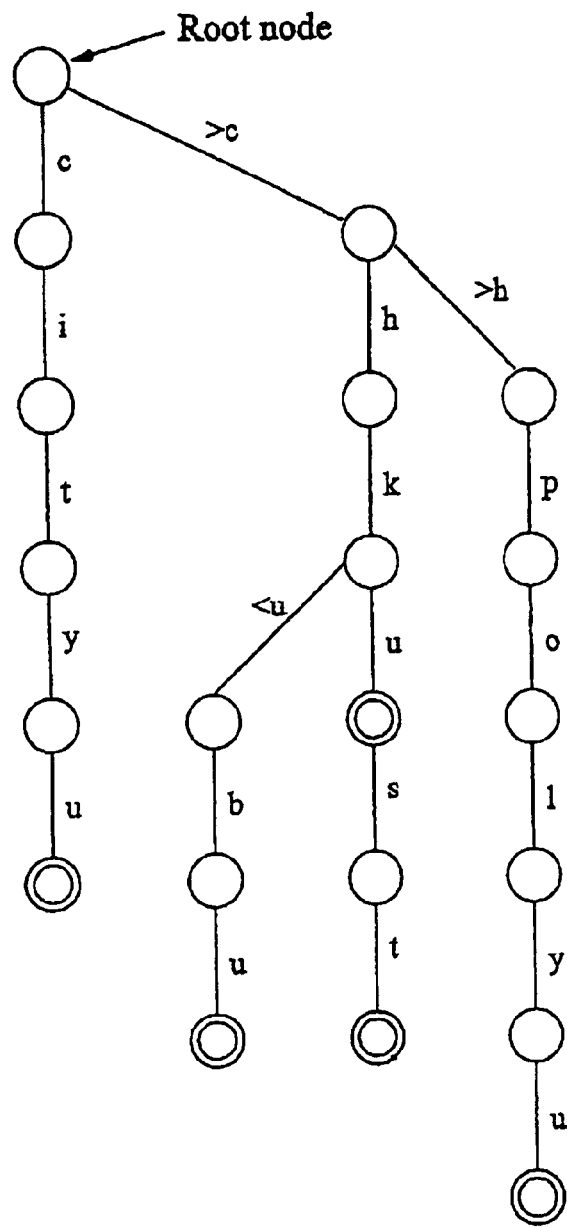
Figure 10(a) BST-Trie (Prior Art)

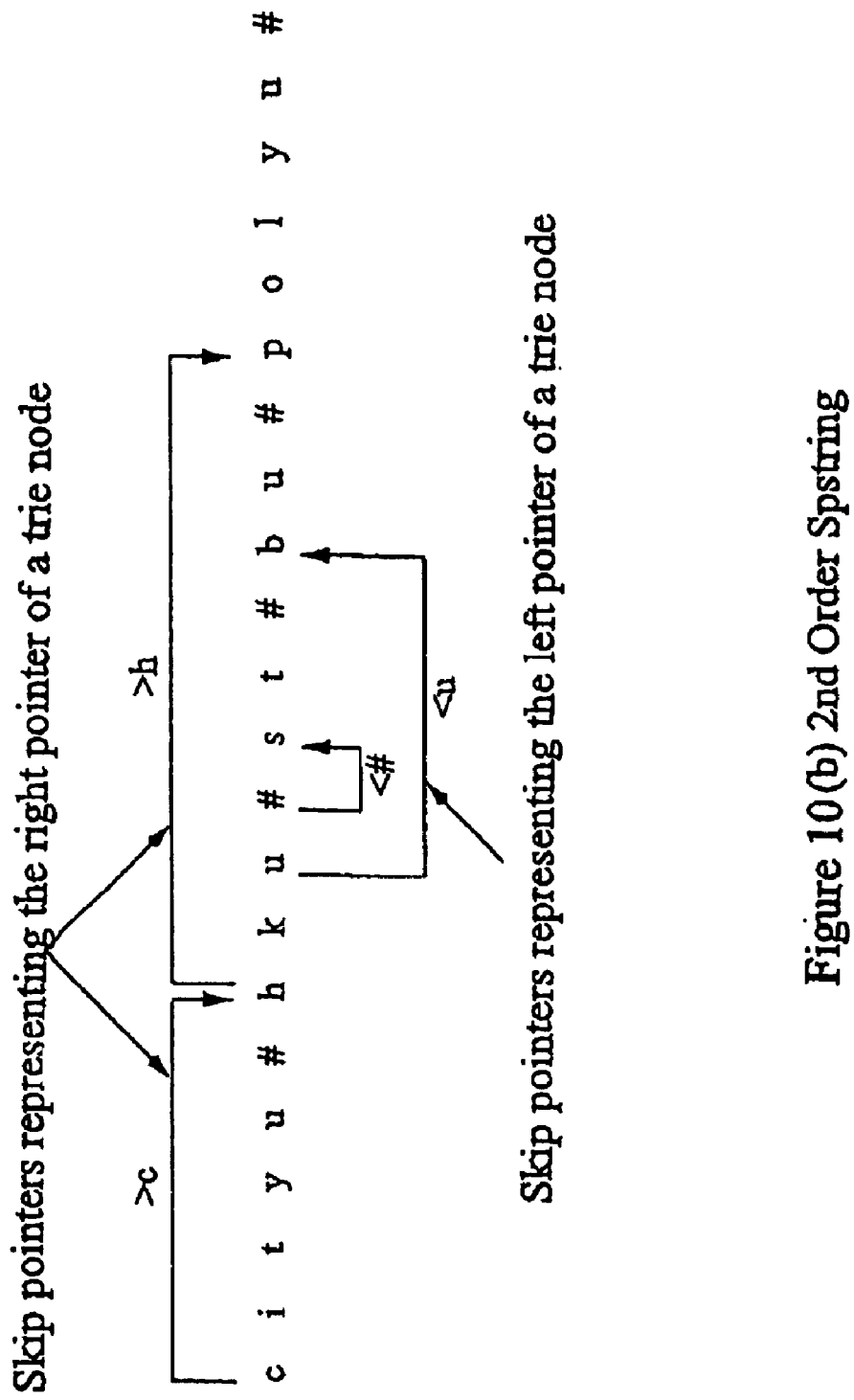
Figure 10(b) 2nd Order Spstring

| Symbol | Description |
|---|---|
| $K$ | A set of keywords. |
| $k_i$ | The $i$th keyword in $K$. |
| $int(.)$ | A function that returns the integer value of the argument (usually a character). |
| $R^2$ | The square of the correlation value of a regression curve. |
| $L$ | The depth + 1 of the deepest node of a trie accessible by level compression. |
| $Ln(.)$ | The natural logarithm of the argument. |
| $card(.)$ | The cardinality of the argument which is a set. |
| $c_a$ | Storage cost of a character (typically 1 byte). |
| $c_p$ | Storage cost of a pointer (typically assumed to be 4 bytes). |
| $\Sigma$ | An alphabet or a character set. |
| $Z$ | The (infinite but denuemerable) set of integers. |
| $Z^+$ | The set of semi-definite positive integers. |
| $R$ | $R = card(\Sigma)$. |
| $V$ | The set of nodes of a trie. |
| $T$ | The number of transitions of a trie. |
| $\bullet$ | Concatenation operator. |
| $\#$ | The symbol representing delimiters. |
| $\lambda_0$ | A special null symbol such that the concatenation of integers with it remains the same. |
| $\Omega$ | The infinite alphabet of tulpes over $(\Sigma \cup \{delimiter\}) \times (Z^+ \cup \{0\})$. |
| $\lambda$ | The null element. |
| $\lambda_s$ | The null tuple element which is $(\lambda, \lambda_0)$. |
| $\Omega^*$ | The Kleene closure over the (finite or infinite) alphabet $\Omega$. |

Table 1

Figure 11A

| Symbol | Description |
|---|---|
| $|k|$ | The length of the keyword or string $k$ measured in bytes or the length of a spstring $k$. |
| $k[i]$ | The $i$th character of the string $k$ or the tuple at the $i$th position of the spstring $k$. |
| $c(.)$ | The homomorphism that extracts the character string of a spstring. It is defined as $c(x = (a,p)) = a$ for $x \in \Omega$, $c(\lambda_s) = \lambda$ and $c(x \bullet y) = c(x) \bullet c(y)$. |
| $r(.)$ | The projection for the pointer $p$ of $x = (a,p) \in \Omega$, i.e. $r(x) = p$. |
| $\sigma_s$ | The stem or character string of the spstring $s$, i.e. $\sigma_s = c(s)$. |
| $f(.)$ | An injective function that maps the set nodes of a trie to positions in the corresponding spstring that represent the trie. |
| $L(K)$ | The total length of a set $K$ of keywords including the terminating character (i.e. the delimiter) of each keyword. |
| $t_c$ | Time to match a character. |
| $t_p$ | Time to traverse a skip pointer. |
| $S_D(K)$ | The storage requirement of a spstring implemented using extensible array for the set $K$ of keywords. |
| $A_D(K)$ | The worst-case time complexity of a successful search over a spstring implemented using extensible arrays, representing the set $K$ of keywords. |
| $S_C(K)$ | The storage requirement of a spstring implemented using packed array for the set $K$ of keywords. |
| $\Rightarrow$ | The immediate sibling relation that exist between two trie nodes $n$ and $m$ such that if $n \Rightarrow m$, then $f(n) = r(s[f(m)])$. |
| $\Leftrightarrow$ | The sibling equivalence relation such that if $n \Leftrightarrow m$, there exists $s$, such that $s \Rightarrow n$ and $s \Rightarrow m$. |
| $E(s)$ | A set of nodes such that if $n \in E(s)$, $s \Rightarrow n$. |

Table 2

Figure 11B

DATABASE AND METHOD FOR STORING A SEARCHABLE SET OF KEYWORDS

BACKGROUND TO THE INVENTION

1. Field of the Invention

The present invention relates to methods for storing a searchable set of keywords. More specifically the invention relates to data structures for storing a set of keywords, and which permits the searching of the set of keywords.

2. Background Information

A Trie, Tree Retrieval, is a well known data structure used to store a searchable set of keywords. Tries solve many diverse and important computational problems, for example dynamic hashing for database systems, dictionary management, approximate string matching (e.g. handwriting recognition [8]) and inverted files for text retrieval to name a few. Recently, tries and their variants, Level Compression tries (LC-tries) and two-tries, have been used in routing, in particular for IP address lookup.

FIG. 1 illustrates a topical trie representing a set of keywords cityu, hkbu, hku, hkust, polyu. Each keyword is represented as a path from the root of the tree, where the edges of the path are labeled with the individual characters of the keyword. The keyword nodes are nodes where the paths from the root node to those nodes represent individual keywords in the set. Hence, all leave nodes of the trie are keyword nodes.

One major advantage of tries is their access speed, which is proportional to the length of the search string and independent of the number of keywords. Another major advantage of tries is their prefix range properties. This enables searching the set of keywords in K which have the same common prefix of an incoming keyword, efficiently, in constant time.

Due to the wide scope of applications of tries, they can be applied in many large-size (database) problems and lean applications. However, one problem with tries is that the have a very high cost of storage, i.e. they take up a lot of memory.

One specific example of the use of tries is for search engines to look up postings of query terms. If both the postings and tries are searched based on disk access, then the number of file seeks increase significantly. It would advantageous to load the tries onto main memory and only load the postings of the query terms from disks or from disk caches. However the large size of tries increases the likelihood of page faults.

With the advent of wireless communications, many mobile applications may find tries useful, for instance, word completion algorithms that assist users input text messages and to formulate queries. They can also be used for approximate string matching to support on-line handwritten character recognition for Portable Digital Assistants (PDAs), and for string searching for pocket-size electronic dictionaries and spelling checkers. Again, the problem with the use of tries in these situations is their high cost of storage.

The storage cost of tries is typically between 4 and 5 times the original storage cost of keywords contained in it. Although the price of RAM is falling, tries are still not space efficient enough to be deployed widely for large-size problems and for lean applications, in particular those operating in mobile devices, even though there are many mobile applications for them.

SUMMARY OF THE INVENTION

It is an object of the present invention to provide a method for storing a searchable set of keywords that requires less storage than known child-sibling linked lists and hashing techniques.

It is a further object of the present invention to provide a data structures for storing a set of keywords, and which permits the searching of the set of keywords.

It is yet a further object of the present invention to ameliorate the disadvantages of known methods and data structures or at least to provide the public with a useful alternative.

According to a first aspect of the invention there is provided a method for storing a searchable set of keywords, each keyword comprising a sequence of characters, including concatenating the keywords to form a string, defining one or more links between two or more characters in the string, and removing any inaccessible characters from the string.

Preferably, the keywords in the string are separated by one or more flags and/or delimiting characters.

Preferably, the link(s) are pointer(s) stored in the string after the character with which they are associated.

Preferably, information associated with each keyword is stored in the string after the keyword. Alternatively, the information is stored in a separate data structure, and a pointer is stored in the string after the keyword to point to the information.

According to a second aspect of the invention there is provided a method for storing a searchable set of keywords, each keyword comprising a sequence of characters, including:

providing on a computer a data structure for the linear storage of a plurality of characters, assigning two or more keyword to said data structure, wherein the keywords are separated by one or more flags and/or delimiting characters, and defining one or more pointers associated with one or more characters in the data structure respectively, each pointer linking a character to another character in the data structure.

Preferably, the method further includes removing any inaccessible characters from the data structure.

Preferably, the data structure is an array or a stream.

Preferably, the pointers are stored in a separate data structure.

Alternatively, the data structure is a packed array, and the pointers are stored in the array after the character with which they are associated.

Preferably, the data structure is a bucket array for storing the keywords and pointers.

Preferably, the method further includes implementing a level compression technique on the data structure.

Preferably, the data structure includes a forward array and backwards linked list, and wherein each node of the linked list has three pointers.

Preferably, the data structure includes a forward array, a backward array and an additional pointer associated with one or more characters in the data structure.

Further aspects of the invention will become apparent from the following description, which is given by way of example only.

BRIEF DESCRIPTION OF THE DRAWINGS

Embodiments of the invention will now be describe with reference to the accompanying drawings in which:

FIG. 9 illustrates a known the two-trie compared to a corresponding two-string according to a method or apparatus of the invention, FIG. 10 illustrates a known the BST-trie compared to a corresponding BST-string according to a method or apparatus of the invention, FIGS. 11A, 11B are tables of mathematical notation used.

DESCRIPTION OF THE PREFERRED EMBODIMENTS

The method of storing a set of keywords according to the invention includes creating a string that is augmented with links in the form of skip pointers. In the following description the string will be referred to as spstring, and the invention will be illustrated using a set of keywords, denoted by K, comprising the keywords cityu, hku, hkust, polyu, and hkbu. Each keyword is a sequence of characters, for example the first keyword is the sequence cityu. In mathematical notation this is. K={cityu, hku, hkust, polyu, hkbu}. However, this is not to be taken as limiting on the invention.

The keywords in K are linearized as a string using a delimiter # to separate different keywords in the linearized string, which is called the stem of the spstring. In terms of the set of keywords K listed above this linearized string is:

cityu#hku#hkust#polyu#hkbu#

Figure 1:
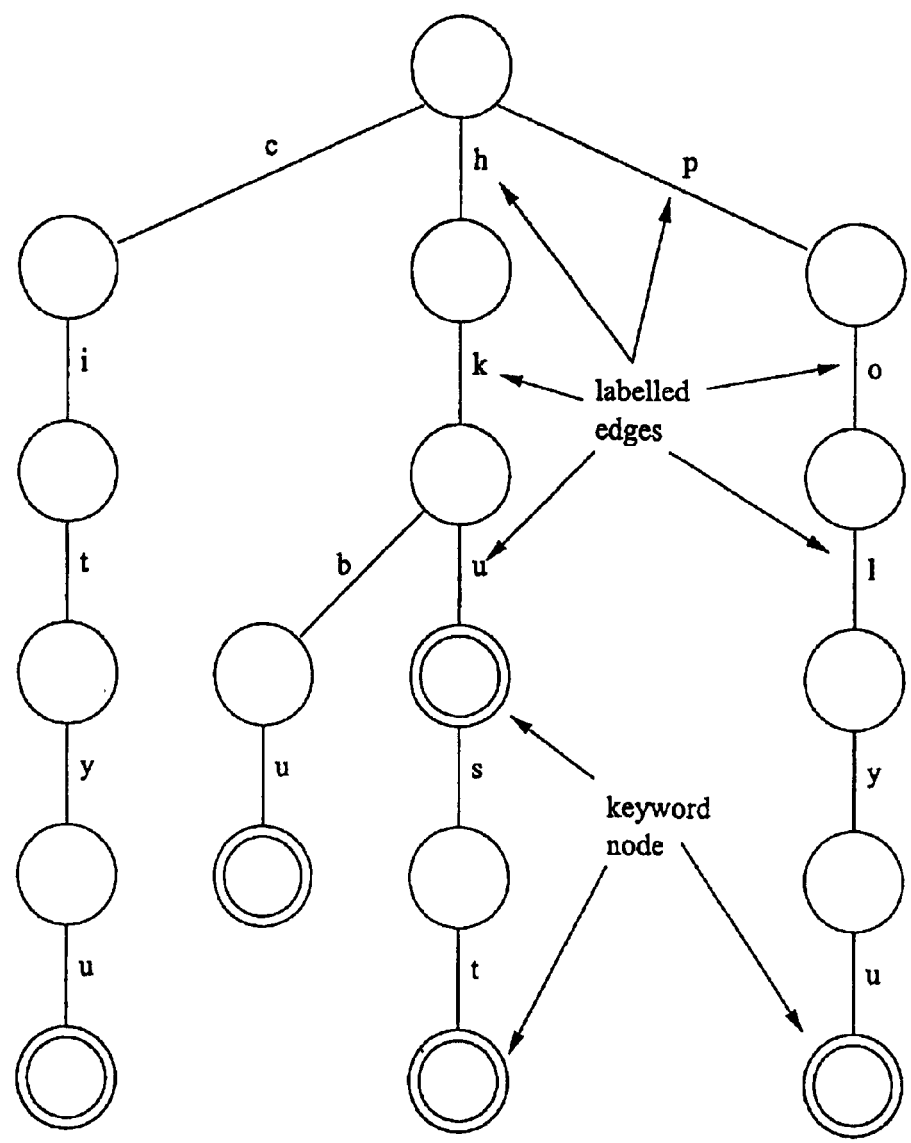
FIG. 1 illustrates a prior art trie representing the set of keywords cityu, hkbu, hku, hkust, polyu.
Figure 2:
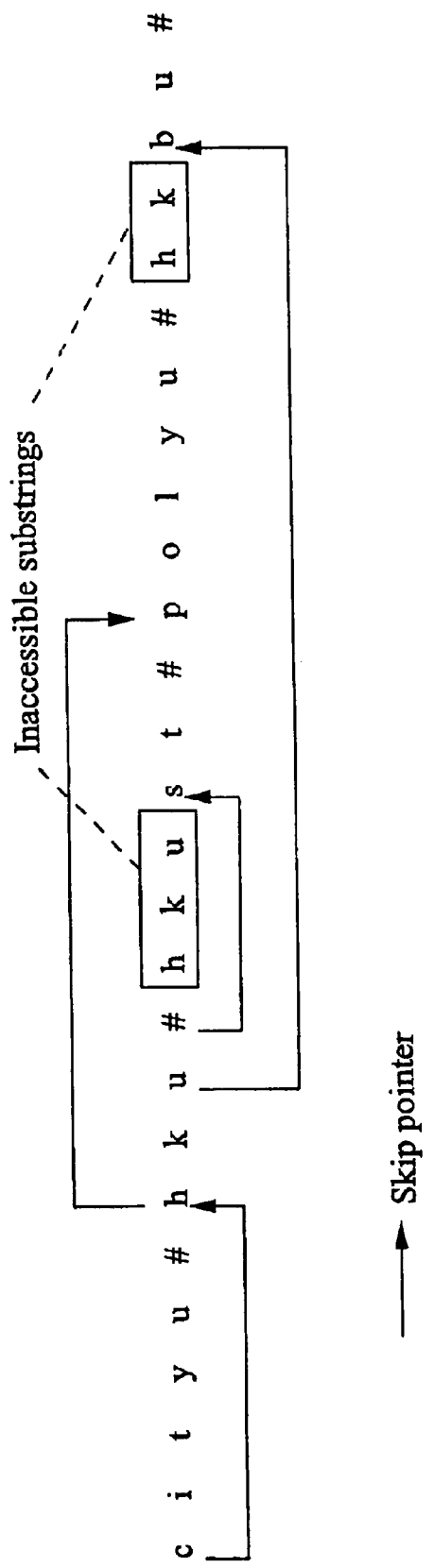
FIG. 2 illustrates the keyword stored in a string.

Referring to FIG. 2, skip pointers, indicated by arrows →, are added to the string to indicate the amount of elements to skip if a mismatch occurs. For example, if searching is carried out from left to right and the search keyword is hku, then a mismatch occurs with the first character c for the above stem. A skip pointer is inserted to skip the entire keyword cityu to the next keyword hku. The skip pointers are stored differently depending on the implementation of the string. These implementations are described later.

The keywords in the string have associated information/data, for example keywords in a dictionary string would have a definition associated with each keyword. In one embodiment of the string this associated information is included in the string immediately after the relevant keyword. To store contact information for Cityu the string might be:

cityu#City:Anycity, Phone:12245678, Fax: 910111212#hku# . . .

A further delimiter (#) indicates the end of the associated information. In an alternative embodiment the information can be stored separately with a pointers stored in the string after the keyword. The pointer indicates the location of the information. For example, cityu#0000#hku# . . .

The first # is a delimiter and the following 0000 is the pointer. The number of bytes in the pointer is fixed (e.g. 4 bytes) so that the pointer can be skipped when moving through the string. The separately stored information is stored as follows:

| 0000 | City: Anycity |
| 0013 | Phone: 12345678 |
| 0027 | Fax: 910111212 |

The pointers can optionally be compressed (e.g. using unary coding, gamma compression, delta compression and Goulomb compression) to reduce storage space.

Some sets of characters within individual keywords, which shall be refer to as sub-strings, are inaccessible because there are no accessible paths to them. There are indicated by the shaded regions in FIG. 2. These inaccessible sub-strings occur for the following reasons. The sub-string hku representing the first three characters in the keyword hkust would never be used for matching because it does not have a skip pointer arriving at the first character h of hkust and no matching occurs beyond the delimiter # proceeding it. The inaccessible sub-strings are distinguished by being preceded in the stem by identical sub-strings within preceding keywords.

Figure 3:
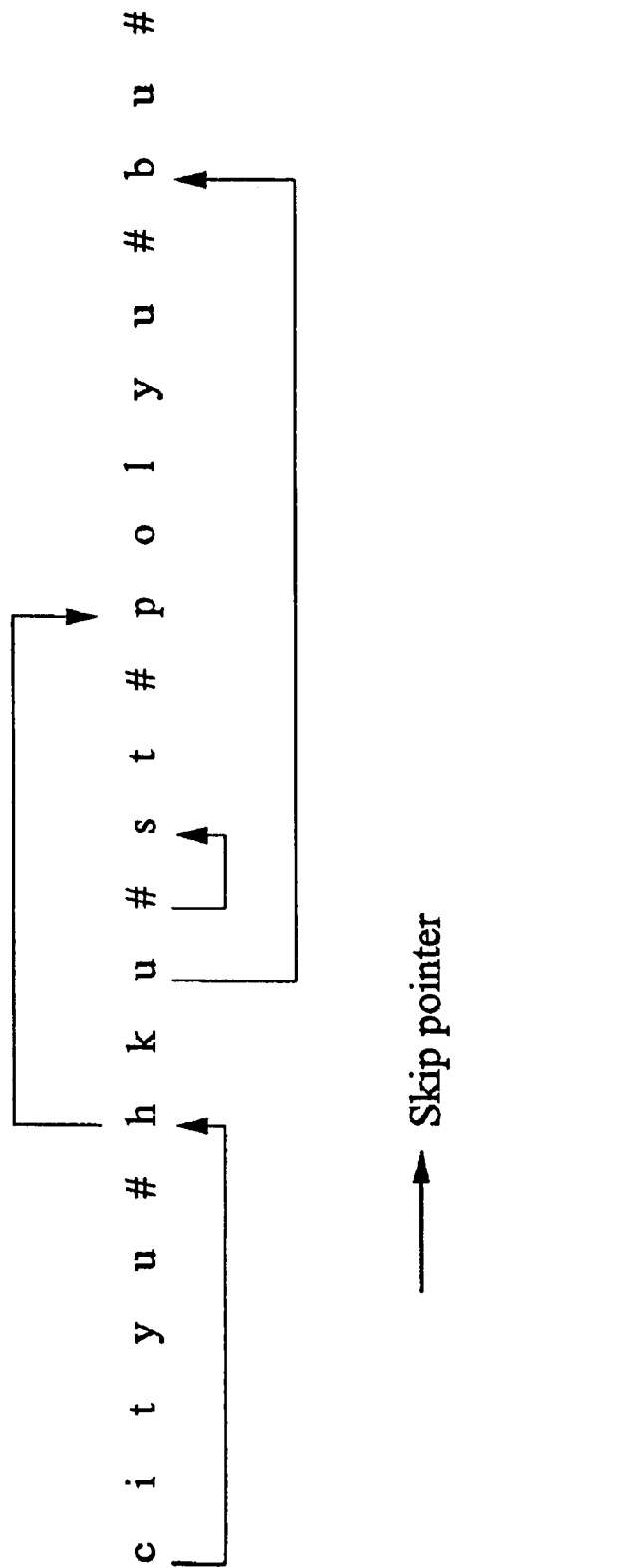
FIG. 3 illustrates the keyword stored in a string according to a method or apparatus of the invention.

Because the inaccessible sub-strings will never be reached during a search there is no need to store them in the string, spstring, and FIG. 2 can be simplified to FIG. 3 by removing the shaded inaccessible sub-strings. The number of pointers of this representation is much smaller than other representations. In particular, the number of skip pointers is 1 less than the number of keywords in the set of keywords K. For example, the spstring in FIG. 3 has 5 keywords and 4 skip pointers. There is only one incoming skip pointer for every keyword (for accessibility), except the keyword at the beginning. If there were two incoming skip pointers to the same keyword, then the tree structure of the trie that the spstring is supposed to represent is destroyed since there are two prefixes of two different keywords that can reach the same node, i.e. the node has two parent nodes. There are only skip pointers because all child pointers are not necessary since the entire keywords are stored as sub-strings.

The spstring illustrate in FIG. 2 represents the entire set of keywords K with skip pointers. The alternative spstring in FIG. 3 corresponds to a child-sibling linked list representation of a trie. This alternative spstring, represented in FIG. 3, is the preferred embodiment as it is more memory cost efficient.

The above string can be defined mathematically as follows. The mathematical notation used is defined in the tables of FIGS. 11A and 11B. An infinite alphabet $\Omega$ can be defined as $\Omega=((\Sigma\cup\{\#\})\times(Z^+\cup\{\lambda_0\}))$, where each element in $\Omega$ is a tuple (a, p) of a character a and a semi-definite positive integer p. $\lambda_0$ is a special character that corresponds to the null character of a string over semi-definite positive integers. A special character called the null element $\lambda_s$ is $(\lambda, \lambda_0)$ where $\lambda$ is the null character or string. In the following description, if it is clear from the context, then the suffix s of $\lambda_s$ is dropped. The concatenation of two characters in $\Omega$: $x=(x_1, x_2)$ and $y=(y_1, y_2)$, is defined as:

$$x \cdot y = (x_1 \cdot y_1, x_2 \cdot x_2)$$

The concatenation of $\lambda_s$ with x is x, requiring that $$x \cdot \lambda_s = (x_1, x_2) \cdot (\lambda, \lambda_0) = (x_1 \cdot \lambda, x_2 \cdot \lambda_0) = (x_1, x_2)$$

A spstring s is an element of the Kleene closure of $\Omega$, i.e.

$$s \in \Omega^*$$

All the characters in $\Omega$ have length one, except that of $\lambda_s$, which is 0. The length of a spstring is the total length of every Ω-character in the spstring. The function |.| returns the length of a spstring if the argument is a spstring. For example, the length of the spstring (a, 1)(b, 2)(c, 3)=(abc, 1.2.3) is 3. In general, $$|x \in \Omega^*| \equiv \max_{x=(a,p)} \{|a|, |p|\}$$

The content of a specific location x of a spstring is indicated using a pair of square brackets and the returned value is a tuple of the form (a, p), i.e.

$$s[x]=(a,p)$$

A projection c:Ω*→(Σ∪{#})* is defined that maps a spstring to a character string and another projection r:Ω→Z⁺ that maps the tuple to a position. The following defines the value of the projections, c(.) and r(.) for a character x in Ω:

$$c(x=(a,p))=a \quad r(x=(a,p))=p$$

The projection c(.) is also defined as a homomorphism, i.e.:

$$c(\lambda_s)=\lambda$$

$$c(x.y))=c(x).c(y)$$

where x and y are in Ω*. The character string of the spstring is called the stem σ of the spstring, which can be defined as:

$$\sigma_s=c(s)$$

Figure 4:
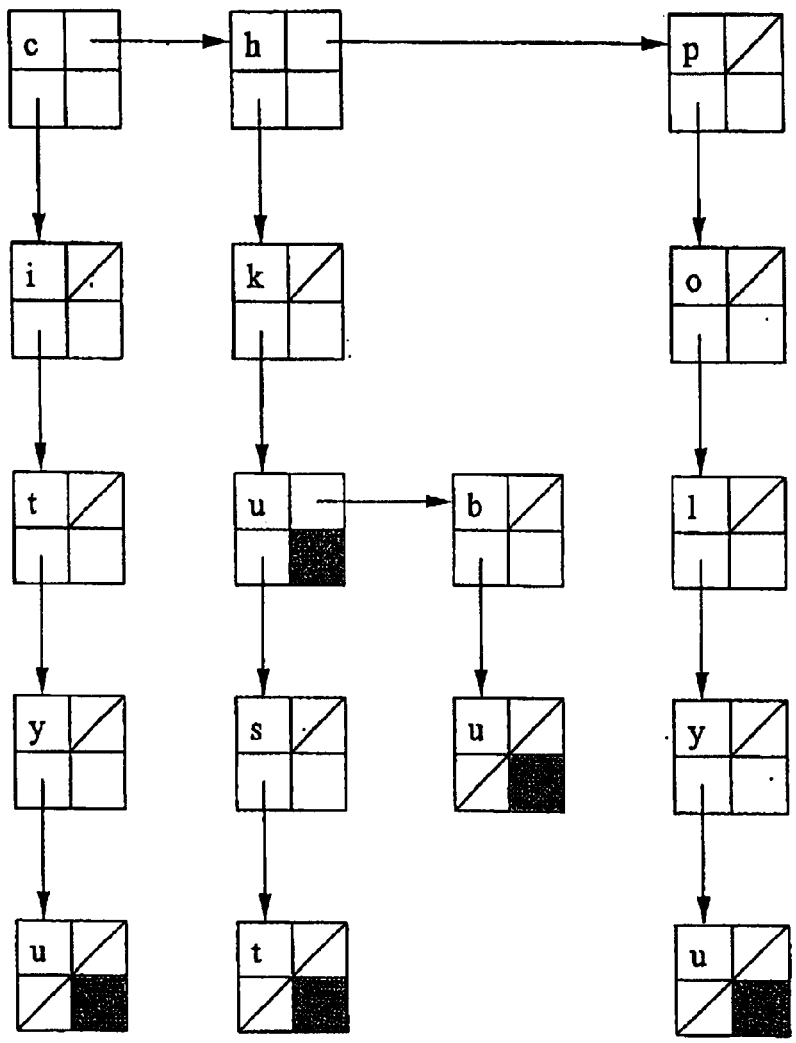
FIG. 4 illustrates a prior art Child-sibling pointer or linked-list representation of the trie in FIG. 1, FIG. 5: illustrates the steps for inserting a keyword string.
Figure 4:
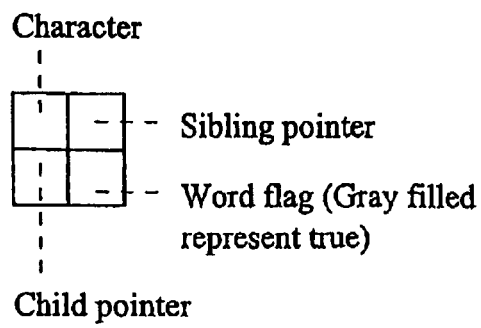

FIG. 4 shows the child-sibling trie representation of the set of keywords K. This trie, represented as a child-sibling linked list, can be converted to a spstring according to the invention. In the child-sibling linked list a node n has a character n→char, a child pointer n→child, a sibling pointer n→sibling and a flag n→word indicating whether the prefix reaching that node is a keyword.

The conversion of a trie τ to a spstring s is based on the following 6 conversion properties. Again, the mathematical notation used is defined in the tables of FIGS. 11A and 11B.
1. Injective Property: There exists an injective function f: V→Z⁺, that maps a node m of τ to a position in s, such that c(s[f(m)])=m→char. Since f(.) is injective, for every pair of nodes m and n, if m≠n, then f(m)≠f(n).
2. Root Property: if r is the root node of τ, then f(r)=1.
3. Termination Property: for every node m of τ, if m→word= true then c(s[f(m)+1])=delimiter.
4. Prefix Word Property: for every node m of τ, if m→word= true and m→child=n≠NULL then f(n)=f(m)+2 and r(s[f(m)+1])=f(n).
5. Continuity Property: for every node m of τ, if m→word= false and m→child=n≠NULL then f(n)=f(m)+1;
6. Sibling Property: for every node m of τ, if m→sibling= n≠NULL then r(s[f(m)])=f(n);

To make the conversion, firstly, the root property is applied so that f(1)=1 and c(s[1])=c. Next, the spstring is extended using the continuity property. In this case, f(2)=f(1)+1=2 and c(s[2])=i. The sibling property cannot be applied to a node before the continuity property because this will destroy the continuity property of that node. In general, the sibling property is applied last. Hence, by the continuity property, f(3)=f(2)+1=3, and f(4)=f(3)+1=4 and f(5)=f(4)+1=5. The termination property will imply that c(s[5+1])= delimiter. Since no other properties can be applied, the sibling property is applied. By the infective property positions 1 to 6 cannot be assigned for node 6 since these positions are used. To maintain the spstring short position 7 is used, so that, by the sibling property, f(6)=7 and r(s(1))=7. Since the continuity property can be applied, f(7)=f(6)+1=8 and f(8)=f(7)+1=9. Since the word flag of node 8 is true, the termination property is applied before the continuity property. In this case, c(s[9+1])=delimiter. Since the prefix word property has a higher priority than the continuity property, f(9)=f(8)+2=11 and r(s[+1])=11. By the continuity property, f(10)=f(9)+1=12. Since the word flag of node 10 is true, the termination property is applied and c(s[12+1]) delimiter. Since no other properties apply apart from the sibling property, it is applied. In this case, there are two possible extensions of spstring based on the sibling property: using node 6 or node 8.

Since they are the same property, using either node 6 or node 8 to extend the spstring is acceptable. In this case, the sibling property is applied to node 6, and f(13)=14 and r(s[6])=f(13)=14. The continuity property can be applied from node 13, so that f(14)=f(13)+1=15, f(16)=f(15)+1=17 and f(17)=f(16)+1=18. Since the word flag of node 17 is true, by the termination property, c(s[18+1])=delimiter. The only property that can be applied is the sibling property of node 8. Hence, f(11)=20 and r(s(8))=f(11)=20. By the continuity property, f(12)=f(11)+1=21. Finally, by the termination property, c(s[21+1])=delimiter. Hence, the length of the spstring that represents the trie in FIG. 4 is 22.

The following algorithm converts the trie in FIG. 4 to an pstring according to the invention.

```
line 0    integer Generate(node n, spstring s)
line 1        begin
line 2            node r ← n;
line 3            integer len ← |s|;
line 4            integer result ← len;
line 5            while (r ≠ NULL) begin {write the path to the
                      sptring}
line 6                s ← s · (r→char, 0); {continuity property}
line 7                if (r→word = true) then
line 8                    if (r→child = NULL) then s ←s· (delimiter,
                              0) {termination property}
line 9                    else s ← s · (delimiter, |s| + 1); {prefix
                              word property}
line 10               r ← r→child;
line 11           end;
line 12           r ← n;
line 13           while (r ≠ NULL) begin {update the sibling/
                      skip pointer}
line 14               if (r→sibling ≠ NULL) then {update if
                          there are siblings}
line 15                   s[len] ← ( r→char, Generate(r→sibling, s));
                              {sibling property}
line 16               len ← len + 1;
line 17               if (r→word = true) then len ← len + 1;
line 18               r ← r→child;
line 19           end;
line 20           return result;
line 21       end;
```

The algorithm begins with the root node, root, of the trie and the null spstring (i.e. Generate(root, λ)). Since initially the spstring is a null string, the root node will be assigned the first position (i.e. 1), satisfying the root property. Lines 5 to 10 add the path, accessed via traversing the child pointer of the nodes of the trie from the current node, to the spstring, for the continuity property. If word flag of the node is true, then a delimiter is inserted into the spstring (for the prefix word or termination properties). Finally, lines 13 to 19 update the skip pointers of the spstring for the sibling property. Since every skip pointer of an spstring corresponds to a sibling pointer of a child-sibling linked-list implementation of the corresponding trie, skip pointer and sibling pointer may be used interchangeably.

The length of the spstring s built using the conversion properties for the trie τ, which has card(v) nodes and which is representing the set K of keywords, is card(v)+card(K).

Two basic operations for an spstring according to the invention will now be described. These are searching for a keyword and updating the spstring with a new keyword.

Searching: consider searching the spstring in FIG. 3 using the search keyword hkbu. The first character is c and is not matched. The skip pointer is followed from the first character c to the first character of the next keyword hku. In this case, the prefix hk of hkbu is matched but the third character b does not match with the third character u of hku. Since there is a mismatch at u, the skip pointer is followed. The new keyword hkbu to be matched starts from the third character, which is b. Matching continues with the fourth character u of the search string hkbu and a match was found. Finally, to indicate the hkbu is in K the delimiter is matched.

For a failure search, the termination occurs when the current mismatch character (including the delimiter) does not have a skip pointer to further the search. For example, the search string ma cannot match with the first character c in the linearized string in FIG. 3, nor the character h pointed to by the skip pointer, nor the character p pointed to by the skip pointer of the character h. The search has to terminate since there are no more skip pointers from p.

The following algorithm, Search(.,.,.), is used to search for a search keyword k in an spstring s. The integers i and j are positions of matching k and s, respectively. The return value is a tuple (x, y). The x value indicates the position in which the spstring has matched up to. If y>0, y indicates the position in which the keyword has matched up to for a failure search. If y=0, then this indicates that the search is successful and the keyword must have matched to the end.

```
line 0   (integer, integer) Search(spstring s, string k,
             integer i, integer j)
line 1   begin
line 2       if (i = |k| + 1) then begin {Termination}
line 3           if (c(s[j]) = delimiter) then return (j, 0);
                 {termination property: successful search}
line 4           else if (r(s[j]) = 0) then return (j, |k|+1);
                 {failure}
line 5           else return Search(s, k, i, r(s[j])); {sibling
                 property: find sibling}
line 6       end;
line 7       else if (c(s[j]) = k[i]) then return Search(s, k,
             i+1, j+1);
             {continuity property: match next position}
line 8       else if (r(s[j]) = 0) then return (j, i); {failure}
line 9       else return Search(s, k, i, r(s[j]));
             {sibling and prefix word properties: find sibling
             or find child node}
line 10  end;
```

In the above algorithm searching begins with i=1 and j=1. If there is a successful match between k[i] and c(s[j]), then matching continues with the next position of k and s (line 7). If there is an unsuccessful match between k[i] and c(s[j]), then matching continues with the new position of s, indicated by the skip pointer r(s[j]) (line 9). If the entire keyword is matched (line 2), then the delimiter must be matched (line 3–5). Sometimes c(s[j]) is not a delimiter and all siblings have to be searched (line 5). If there are no more siblings to match then a search failure occurs (line 4 and 8).

Updating: The incremental construction of an spstring starts with the null linearised string and uses the following algorithm, Insert(..., ...), to added keywords.

```
line 0   void Insert(spstring s, string k)
line 1   begin
line 2       integer pos;
line 3       integer last;
line 4       (pos, last) ← Search(s, k, 1, 1);
line 5       if (last ≠ 0) then begin {no keyword k in
             spstring s}
line 6           s[pos] ← (c(s[pos]), |s| + 1);
                 {sibling property: update skip/sibling pointer}
line 7           pos ← last;
line 8           while (pos ≤ |k|) begin {add the unmatched
                 suffix of the keyword k}
line 9               s ← s · (k[pos], 0); {continuity property}
line 10              pos ← pos + 1;
line 11          end;
line 12          s ← s · (delimiter, 0); {termination property}
line 13      end;
line 14  end;
```

In this algorithm, the spstring s is searched for each keyword $k_i$ to be inserted (line 4). When there is a search failure, say at character x, at position p (line 5) a skip pointer is added for x at position p (line 6). That skip pointer points to the last position of the spstring plus one. The unmatched suffix of $k_i$ is appended to the linearized string (line 8 to 11) and the final position is terminated with the delimiter character (line 12).

Figure 5:
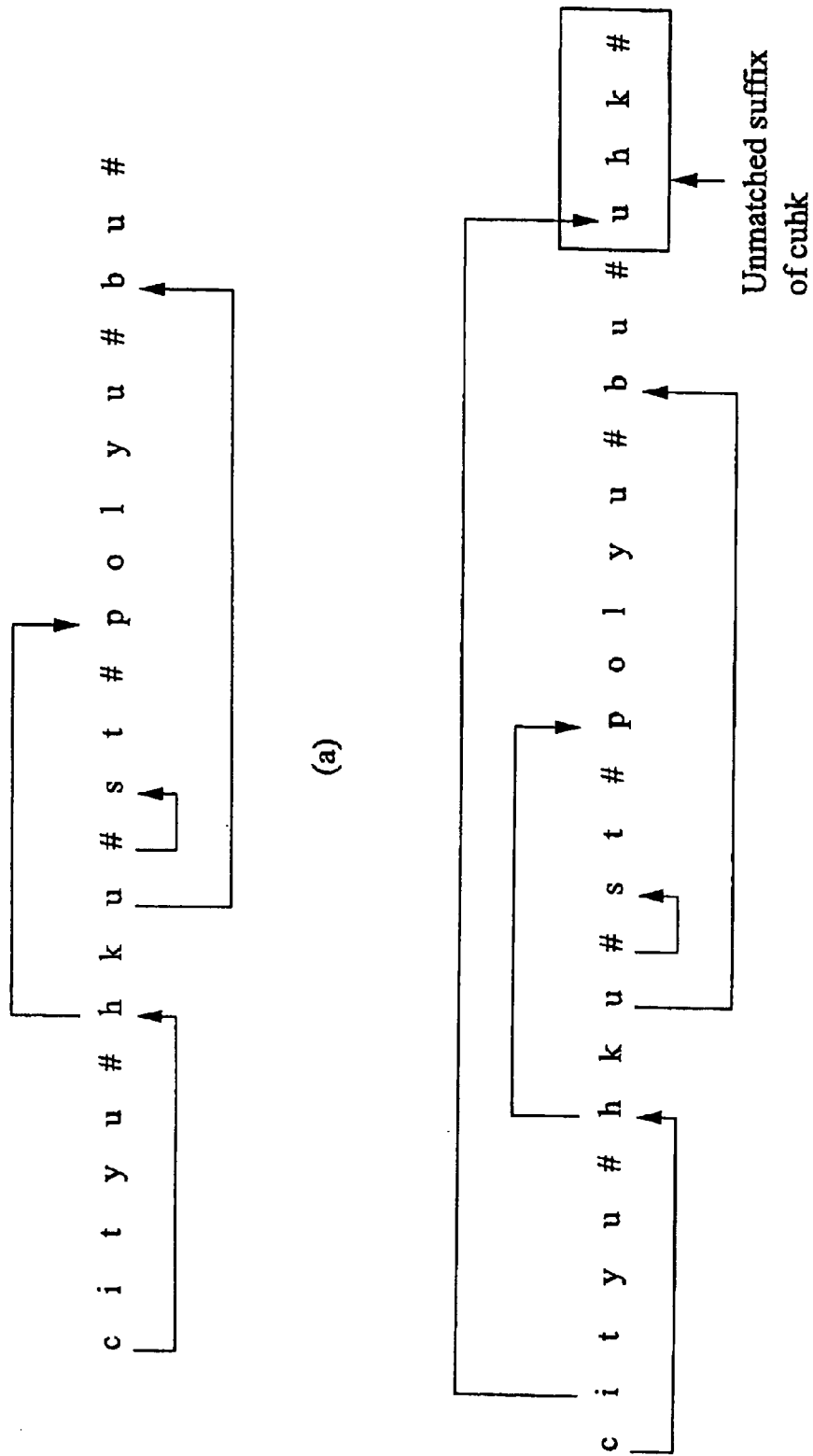

FIG. 5 illustrates the two steps for inserting the keyword cuhk to spstring. The first step, in FIG. 5(a), shows the mismatch position two, assuming that the first character is in position one. The second step, in FIG. 5(b), adds the skip pointer and the unmatched suffix uhk at the end of the linearized string.

The correctness of the algorithm can be verified by examining whether the added skip pointer and the unmatched suffix satisfy the conversion properties. For adding the skip pointer (line 6) there are no violation of the sibling property because the skip pointer is added at the position pos of search failure where the skip pointer value r(s(k[pos])) must be 0 (i.e. not destroying any previous skip pointers) and the skip pointer points to a new position in the spstring, not affecting the original spstring.

For appending the unmatched suffix more conversion properties need to be considered. First, since each character of the unmatched suffix is appended to the spstring (line 9 and 10) the injective property is satisfied. Appending the adjacent characters of the unmatched suffix is also in adjacent positions satisfying the continuity property. Since the delimiter # is appended at the end (line 12) the termination property is also satisfied. Since there are no skip pointers for the unmatched suffix there is no need to consider the sibling property. Hence, the incremental insertion does not produce a new spstring that violates the conversion properties.

A number of data structures can be used to implement an spstring string. These are discussed below. The keywords $k_i$ in K are indexed by i. The number of characters L(K) of the linearized string for the set K of keywords is:

$$L(K) = \sum_{i=1}^{|K|} (|k_i| + 1)$$

If the storage cost of a character is the unit cost then L(K) represents the amount of storage needed for the linearised string. Due to caching, reading adjacent characters in a string only incurs a fractional cost $c_s$ compared with traversing a pointer.

Direct implementation of the string uses an (extensible) array or a stream, and stores the set of skip pointers using an array of pointers. Since it is not known which character has a skip pointer there is one skip pointer for every character in the string. Therefore, the total storage $S_D(K)$ is:

$$S_D(K)=L(K)+L(K) \times c_p$$

where $c_p$ is the storage cost of a pointer and where every character incurs a unit cost.

Figure 6:
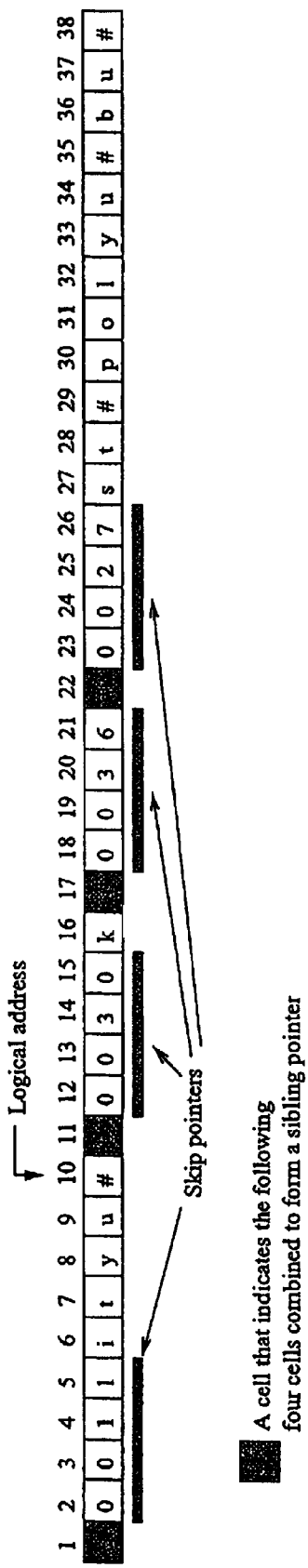
FIG. 6 illustrates a packed array implementation of the string in FIG. 3.

The extensible array implementation wastes a lot of storage for storing skip pointers with null values, An alternative implementation of the packed array illustrated in FIG. 6. This implementation stores the skip pointers after the character. A bit is used to indicate whether the character has a trailing skip pointer. The storage demand $S_c(K)$ of a packed array implementation of the spstring is:

$$S_C(K)=L(K)(1+c_b)+(|K|-1)c_p$$

where $c_b$ is the storage cost of a bit.

Figure 7:
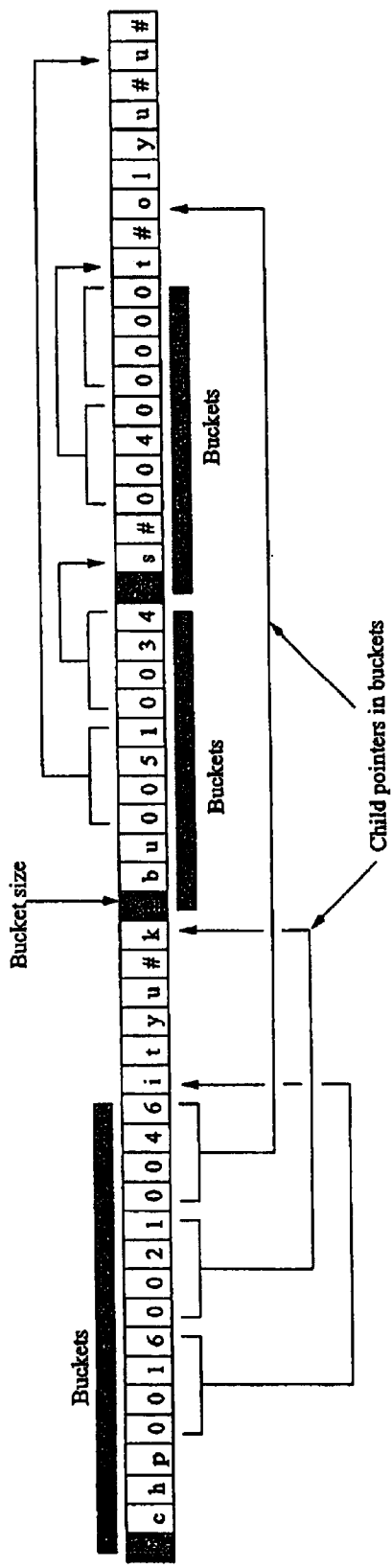
FIG. 7 illustrates a bucket array implementation of the string in FIG. 3.

The search speed of the extensible array and packed array implementations are approximately equivalent. To increase the search speed without significantly increasing the storage demand, the skip pointers are stored in bucket arrays as illustrated by FIG. 7.

The bucket array stores the character and the associated pointer. Each bucket has a size variable which incurs the same storage cost as a character (i.e. $\lceil \log_2 |\Sigma| \rceil$ bits). An extra bit is allocated for each position, to distinguish between a character and a bucket size variable. Once the bucket size variable identified, the number of characters in the buckets and the number of pointers in the buckets are known. For example, the first position of the spstring in FIG. 7 is a bucket size variable, which has a value of 3. In this case, the following 3 positions store the 3 characters of the bucket and the next 12 positions store the pointers, assuming each pointer incurs 4 times the storage cost of a character. The skip pointers in the bucket array are the child pointers of the corresponding trie instead of the sibling pointer.

The bucket array allows an interpolation binary search [29] to be used to improve the search speed.

Figure 8:
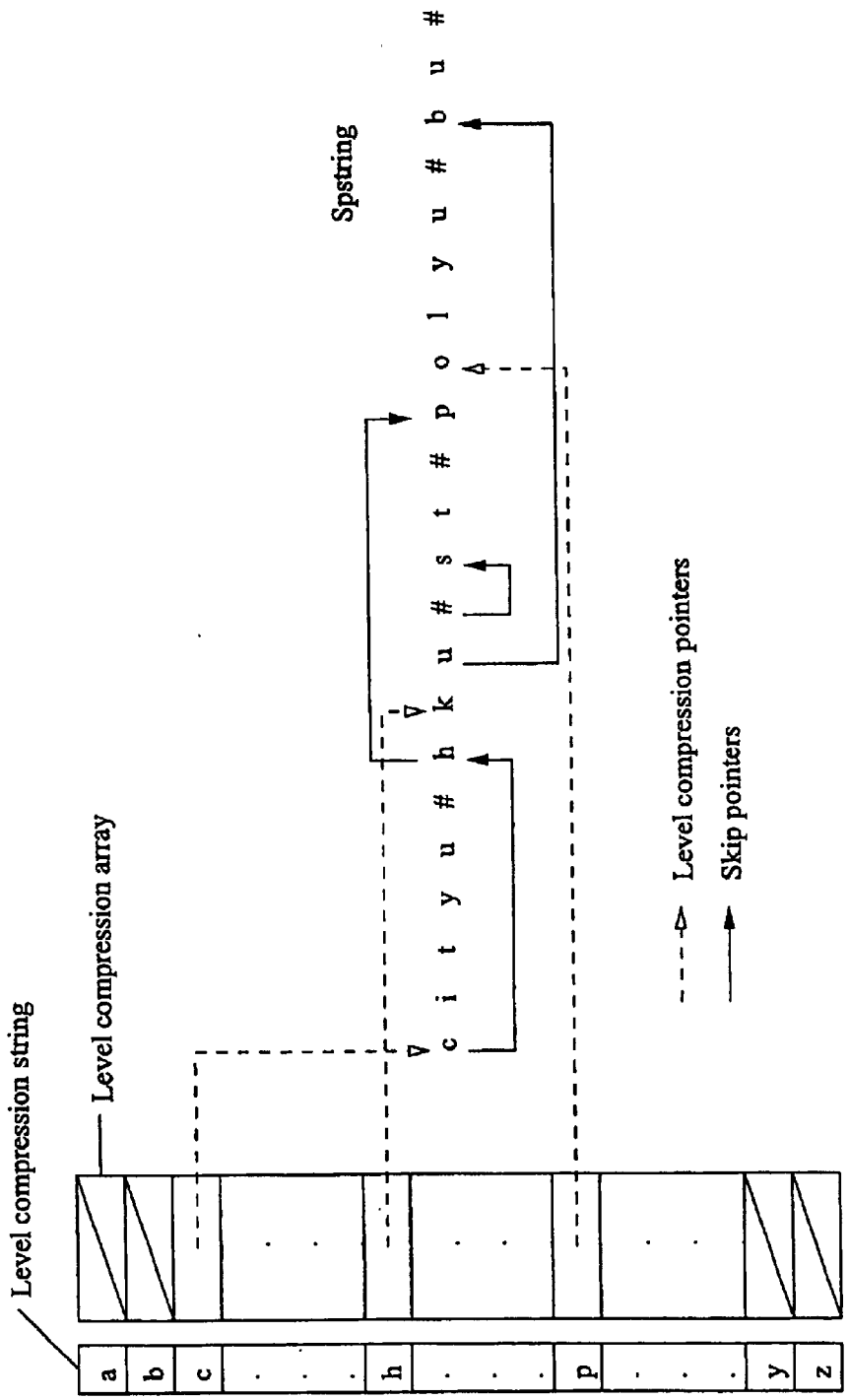
FIG. 8 illustrates compression of the string in FIG. 3.

One concern of the spstring is that they may be slow to access. To improve access speed, level compression techniques, which were used in LC-tries, can also be used for spstrings. For a discussion on level compression techniques used in LC-tries is: Nilsson, S. and Karleson N. 1999. G. *IP-address lookup using LC-tries*, IEEE Journal on Selected Areas in Communications, 17, 6, 1083–1092. FIG. 8 illustrates the spstring in FIG. 3 with level 0 compression.

Two-trie data type can also be implemented using spstrings. The forward trie is implemented using the extensible array implementation of spstrings and the backward trie is implemented using a child-sibling linked list where each node of the linked list has three pointers for effective insertion and search speed (i.e. tri-pointer nodes).

To improve storage efficiency an alternative embodiment uses spstrings implemented using extensible arrays for the backward tries. To ensure the fast access speed, an additional pointer is added to each position of the spstring. The additional pointer points to a previous position, representing the equivalent parent trie node of the trie node represented by the current position of the spstring. Hence, for an extensible array implementation of spstrings each position has two pointers. This type of extensible array is called a second-order extensible array and the corresponding spstrings of the invention are called second-order spstrings. In general, an $N^{th}$ order spstrings would require N skip pointers for each position of the spstring. For static two-trie data types (i.e. with no updates) the forward trie could be implemented using packed or bucket array implementation of spstrings and the backward trie could be implemented as the union-find data structure, which is simply an array of parent pointers. In this latter case the number of parent pointers is equal to the number of transitions in the backward trie.

FIG. 9 shows the two-trie representation of the set of keywords in FIG. 3. The leave nodes of the forward trie contain a pointer to a node in the backward trie for matching purposes. If the two-trie is implemented using a linked list the child pointer of a leave node is used to point to the corresponding node in the backward trie. To indicate that this is not an ordinary child pointer the pointer value is negative, whereas original child pointer values are positive. The forward trie is represented by an spstring.

In the spstring embodiments described so far the delimiter # is used to indicate the end of the keyword. In this embodiment the delimiter has a corresponding pointer that points to the location in the corresponding spstrings that represent the corresponding backward trie. For example, to determine whether hkust is a keyword, search begins with the forward trie. The leftmost delimiter is reached after matching the prefix hku. Since the (leftmost) delimiter is encountered, search continues with the backward trie at location 7 (stored as the skip pointer value of the delimiter). At location 7 of the spstring for the backward trie, the character s is matched. Since the match is successful the parent trie node is accessed by traversing the corresponding skip pointer below the spstring for the backward trie (FIG. 9). Location 6 is found and the character t is matched. Since the match is also successful the parent node is accessed by traversing the corresponding skip pointer below the spstring for the backward trie (FIG. 9). Location 1 is accessed. Since the entire keyword is matched when location 1 of the spstring for the backward trie is reached the search is successful.

The length of the spstring for the backward trie is clearly the number of transitions in the backward trie since there is no need to store a delimiter for each leave node of the backward trie. For static representations of backward tries parent pointers that point to the previous locations can be eliminated. For instance, the parent pointers for location 2, 3, 4, 5, 7 and 10 of the spstring for the backward trie in FIG. 9 can be eliminated. The parent pointers left in the spstring correspond to the sibling pointers of the backward trie in the reverse direction. Hence, the total number of parent pointers is $|K|-1$.

Spstring can be extended to represent a BST-trie $\tau_b=(V_b, E_b)$ as well where $V_b$ is a set of nodes of the BST-trie and $E_b$ is the set of edges of the BST-trie. For a discussion of PST-trie see: Bentley, J. and Segewick, R. 1997. Fast algorithms for sorting and searching strings. In Proc. $8^{th}$ Annual ACM-SIAM Symposium on Discrete Algorithm, New Orleans, 360–369.

The number of nodes of BST-trie is at least card(V) and at most card(V)+card(K)−1, where V is the set of nodes of the correspond trie representing K. Hence, the storage cost of BST-tries implemented as an array of 3 child pointers is at least $3 \times (C_p+C_a) \times \text{card}(V)$ and at most $3 \times (C_p+C_a) \times [\text{card}(V)+\text{card}(K)-1]$.

Instead of associating a single skip pointer for every position, two skip pointers are stored. This second order spstring can be defined as a string over $\Sigma^* \times (Z^+ \cup \{\lambda_0\}) \times (Z^+ \cup \{\lambda_0\})$. Each node of a BST-trie corresponds to a position in the second-order spstring. The left pointer of a BST-trie node is represented by the first skip pointer and the right pointer by the second skip pointer. The child pointer of a BST-trie node is not represented in the second-order spstring. Instead, it is implicitly represented by the adjacent positions in the spstring. If the current character is matched, the following character is compared in the spstring, which is equivalent to traversing the child pointer of the current BST-trie node. FIG. 10 shows a BST-trie and the corresponding second order spstring representing the keywords in FIG. 3. This second order spstring is called a BST-trie spstring. The set of skip pointers on top of the spstring in FIG. 10(b) represents the right pointers of the BST-trie nodes and the set below the spstring represents the left pointers of the BST-trie nodes.

The length of the second-order spstring is the number of BST-trie nodes that have child pointers plus card(K) (for the delimiters). The extensible array implementation of the second-order spstrings would save one child pointer for each BST-trie node. This represents a storage saving of about a 31%

$$\left(\frac{4}{13}\right).$$

BST-tries can be represented by second-order spstrings using packed arrays.

Where in the foregoing description reference has been made to elements or integers have known equivalents or substitutes then such are included as if individually set forth herein.

Embodiments of the invention have been described, along with specific implementations thereof. It is understood that variations, improvement or modifications can take place without departure from the spirit of the invention or scope of the appended claims.

What is claimed is:

1. A method in a computer of storing as a string a searchable set of keywords, comprising:
   inputting into a computer a least two keywords each consisting of a sequence of characters,
   concatenating the keywords to form a string consisting of the sequences of characters separate by delimiter characters,
   defining a match path consisting of a next character in the string,
   defining a mismatch path comprising a pointer linking a first character in one of the sequences of characters with a second character in another one of the sequences of characters, and
   removing from the string any characters inaccessible by either the match path or the mismatch path.

2. The method of claim 1 wherein the pointer is stored in the string immediately after the first character.

3. The method of claim 1 wherein information associated with the keywords is concatenated with the string immediately after the keywords.

4. The method of claim 1 wherein information associated with the keywords is stored in a separate data structure, and a pointer to the separate data structure is concatenated with the string immediately after the keyword.

5. A method in a computer of storing a searchable set of keywords, comprising:
   providing in a computer a data structure for linear storage of plurality of characters,
   inputting into the computer at least two keywords each consisting of a sequence of characters,
   entering into the data structure the keyword characters and a delimiting character separating the keywords in the data structure, and
   defining search paths through the data structure comprising a match path consisting of the next sequential character in the data structure and a mismatch path comprising a pointer linking a first character in the data structure with a second character in another part of the data structure, and
   removing from the data structure any characters inaccessible by the search paths.

6. The method of claim 5 wherein the data structure is an array or stream.

7. The method of claim 5 wherein the pointers are stored in a second data structure.

8. The method of claim 5 wherein the data structure is a packed array, and the pointers are stored in the array after the character with which they are associated.

9. The method of claim 5 wherein the data structure is a bucket array for storing the keywords and pointers.

10. The method of claim 5 further including implementing a level compression technique on the data structure.

11. The method of claim 5 wherein the data structure includes a forward array and backwards linked list, and wherein each node of the linked list has three pointers.

12. The method of claim 5 wherein the data structure includes a forward array, a backward array and an additional pointer associated with one or more characters in the data structure.

13. A method in a computer of storing in a string a searchable keyword consisting of two or more characters, the string having one or more existing groups of characters separated by delimiter characters and skip-pointers, the method comprising:
   inputting into a computer keyword,
   identifying in the keyword a first sub-group of characters identical to an existing group of characters in the string and a second sub-group of characters not existing in the string,
   concatenating the second sub-group of characters with the string, and
   defining a pointer linking the existing group of characters to the second sub-group of characters.

* * * * *